April 12, 1955 E. J. WILLIAMS 2,706,033
CONTRACTIBLE CONVEYOR
Filed Jan. 2, 1952 2 Sheets-Sheet 1

INVENTOR.
EDWARD J. WILLIAMS
BY HIS ATTORNEYS.
HARRIS, KIECH, FOSTER & HARRIS

April 12, 1955  E. J. WILLIAMS  2,706,033
CONTRACTIBLE CONVEYOR
Filed Jan. 2, 1952  2 Sheets-Sheet 2
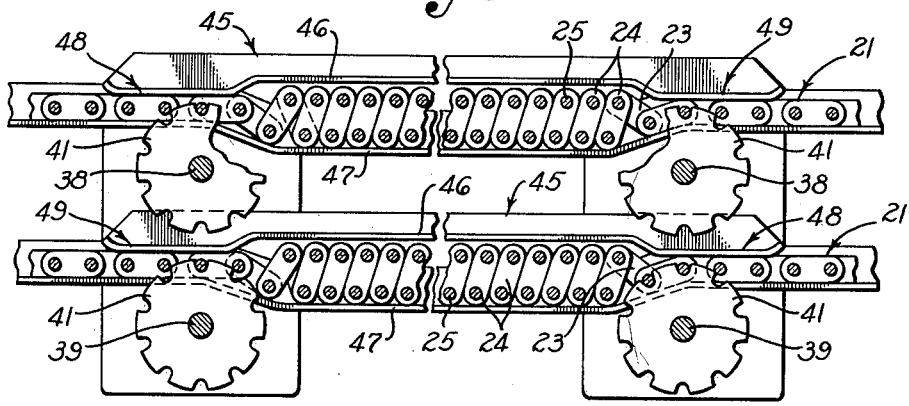
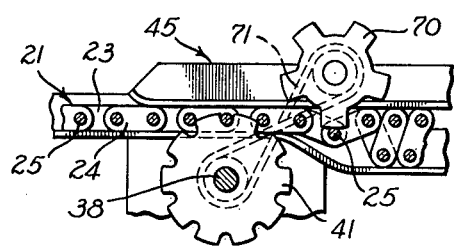
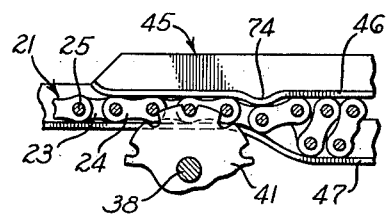
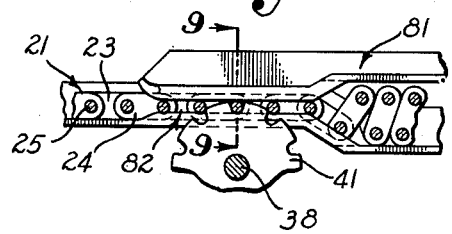
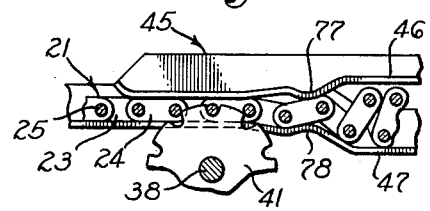
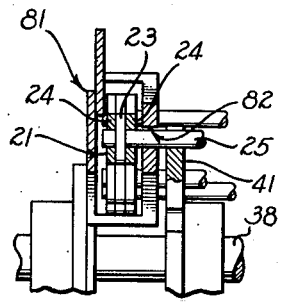
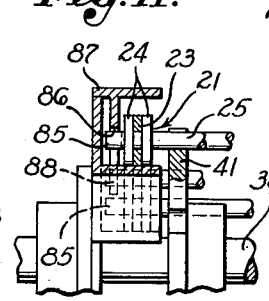
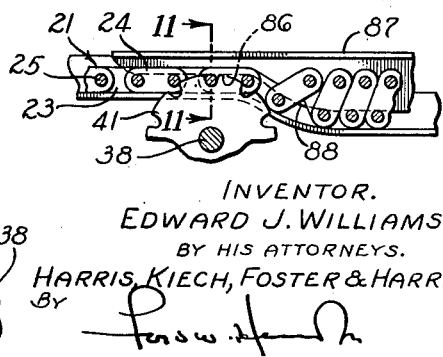
INVENTOR.
EDWARD J. WILLIAMS
BY HIS ATTORNEYS.
HARRIS, KIECH, FOSTER & HARRIS

United States Patent Office 2,706,033
Patented Apr. 12, 1955

2,706,033

CONTRACTIBLE CONVEYOR

Edward J. Williams, Burbank, Calif., assignor to Read Standard Corporation, a corporation of Delaware Application January 2, 1952, Serial No. 264,367

13 Claims. (Cl. 198—182)

The present invention relates in general to conveyors and a primary object of the invention is to provide a conveyor having two parallel conveyor elements one of which may be collapsed or contracted to permit the conveyor to move along a curved path or both of which may be collapsed or contracted to reduce the speed of the conveyor.

Another object is to provide a conveyor wherein the two conveyor elements carry load-supporting means which is capable of differential longitudinal contraction transversely thereof so that one side of the load-supporting means carried by the conveyor elements may contract longitudinally more or less than the other. A related object is to provide a load-supporting means which includes cross members extending between the conveyor elements and each connected at its ends to the conveyor elements, respectively.

Another object is to provide a conveyor wherein the two conveyor elements are chains adapted to be pleated by stacking the links thereof together so as to permit curvilinear movement of the conveyor, or to permit linear movement thereof at reduced speed.

Another object is to provide means for pleating at least one of the conveyor chains which includes interconnected sprockets meshed with the cross members of the conveyor at opposite ends of a predetermined zone of movement of the conveyor chain to be pleated, the sprockets being spaced apart a distance less than the unpleated length of conveyor chain therebetween so that the chain links are stacked together intermediate the sprockets. A related object is to provide guide means extending throughout the zone between the sprockets for confining the pleated portion of the conveyor chain.

Another object is to provide cam means for deflecting each conveyor chain to be pleated so as to initiate the pleating action. Related objects are to provide a cam or cams associated with the guide means for the conveyor chain, and to provide a cam having the form of a sprocket adapted to engage alternate cross members of the conveyor to initiate the pleating action.

The foregoing and various other objects and advantages of the present invention may be attained with the exemplary embodiments which are illustrated in the accompanying drawings and described in detail hereinafter. Referring to the drawings:

Fig. 3 is an enlarged sectional view taken as indicated by either of the two arrowed lines 3—3 of Fig. 1;

Fig. 5 is a fragmentary sectional view similar to a portion of Fig. 3, but illustrating another embodiment of the invention;

Figs. 6, 7, 8 and 10 are fragmentary sectional views similar to Fig. 5 but illustrating other embodiments of the invention;

Figs. 9 and 11 are sectional views respectively taken along the arrowed lines 9—9 and 11—11 of Figs. 8 and 10.

Figure 1:
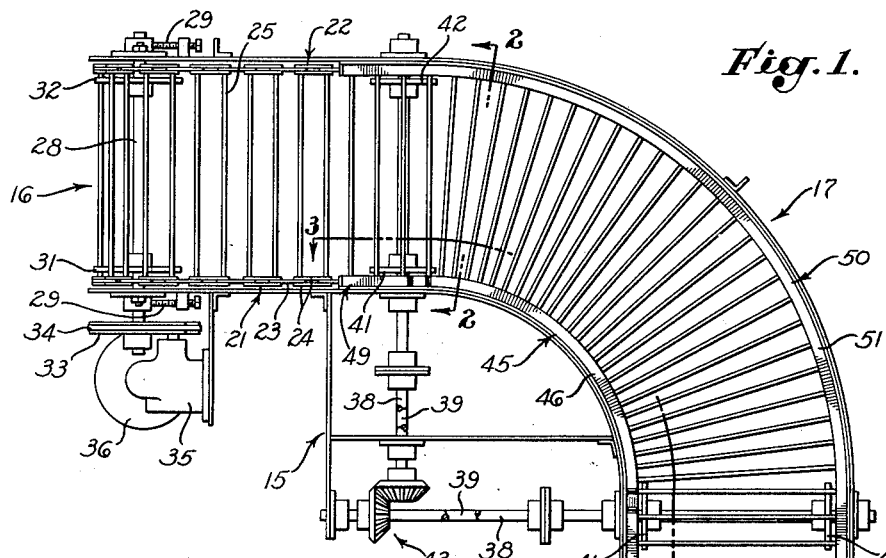
Fig. 1 is a plan view of a conveyor which, for purposes of illustration, embodies the present invention both in a curvilinear section and in a linear section.

Referring particularly to Fig. 1 of the drawings, illustrated therein is a frame 15 which carries a conveyor 16 of the invention, the conveyor having a curvilinear section 17 and a linear, speed-reducing section 18.

While the curvilinear section 17 of the conveyor 16 is illustrated as producing a 90° bend in the conveyor 16, it will be understood that this angle may be increased or decreased as required and it will be further understood that the invention may be embodied in a helical conveyor, if desired.

Considering the conveyor 16 in more detail, it includes two spaced, substantially parallel conveyor elements, illustrated as conveyor chains 21 and 22, which are movable along spaced, substantially parallel paths. Each of the conveyor chains 21 and 22 is shown as comprising alternate single links 23 and double links 24, the conveyor 16 including load-supporting means carried by the conveyor chains which is capable of differential longitudinal contraction transversely of the conveyor so that one side of the conveyor may be contracted longitudinally more or less than the other. This load-supporting means comprises cross members, illustrated as rods 25, which extend between the conveyor chains 21 and 22 and which are connected at their respective ends to the conveyor chains. Preferably, each end of each rod serves as a pivot for one of the single links 23 and adjacent double links 24. Thus, the alternating single links 23 and double links 24 of the two conveyor chains 21 and 22 are pivotally interconnected by the load-supporting rods 25.

Carried by the frame 15 at the ends of the conveyor 16 are shafts 28, these shafts being mounted in bearings which are adjustable by means of adjusting screws 29 to vary the tension in the conveyor. Each of the shafts 28 carries sprockets 31 and 32 around which the conveyor 16 is trained, the sprockets 31 being disposed adjacent the chain 21 and sprockets 32 being disposed adjacent the chain 22. The sprockets 31 and 32 mesh with the rods 25 adjacent the respective chains 21 and 22, each of the sprockets preferably being a disc having semicircular notches therein for the rods 25 to avoid projections. One of the shafts 28 carries a drive pulley 33 around which is trained a belt 34, this belt also being trained around a pulley on a gear box 35 which is driven by a motor 36 in the particular construction illustrated.

Figure 2:
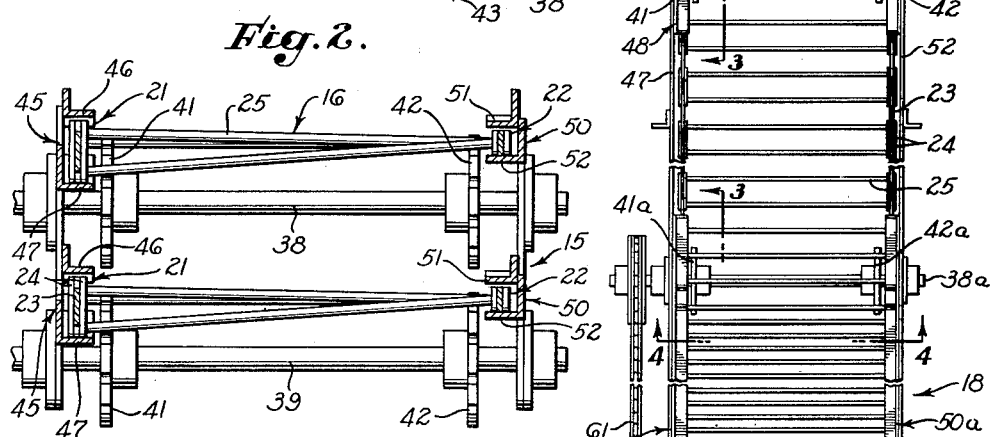
Fig. 2 is a transverse sectional view taken along the arrowed line 2—2 of Fig. 1.
Figure 4:
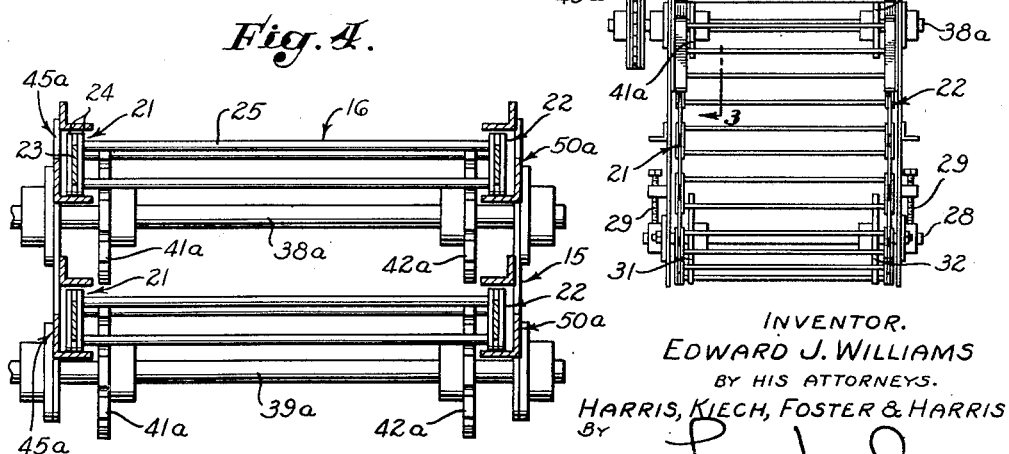
Fig. 4 is a transverse sectional view taken along the arrowed line 4—4 of Fig. 1.

Mounted in suitable bearings carried by the frame 15 at the respective ends of the curvilinear section 17 of the conveyor 16 are upper shafts 38 and lower shafts 39. The lower shafts 39 are disposed directly beneath the upper shafts 38 in Fig. 1 of the drawings and are best shown in Figs. 2 and 3 of the drawings. Each of the shafts 38 and 39 carries two sprockets 41 and 42 respectively adjacent the conveyor chains 21 and 22, the sprockets 41 and 42 carried by the upper shafts 38 meshing only with the rods 25 of the upper run of the conveyor 16, and the sprockets 41 and 42 on the lower shafts 39 meshing only with the rods 25 of the lower run of the conveyor. The two upper shafts 38 are interconnected by gearing them together at 43, the two lower shafts 39 being interconnected in a similar manner, not shown.

The distance between the sprockets 42 on the upper shafts 38 is substantially equal to the length of conveyor chain 22 therebetween so that the upper run of conveyor chain 22 throughout the curvilinear section 17 is uncontracted or uncollapsed. The same is true of the lower run of the conveyor chain 22 between the sprockets 42 on the lower shafts 39. However, the distance between the sprockets 41 on the upper shafts 38 is less than the length of conveyor chain 21 and the distance between the sprockets 41 on the lower shafts 39 is likewise less than the length of conveyor chain 21 therebetween. Thus, throughout the curvilinear section 17, both the upper and lower runs of the conveyor chain 21 are contracted or collapsed so as to compensate for the extra lengths of conveyor chain 21 between the sprockets 41 on the upper shafts 38 and the sprockets 41 on the lower shafts 39. The upper and lower runs of the conveyor chain 21 throughout the curvilinear section 17 are forced into this collapsed or contracted state because of the fact that the corresponding pairs of sprockets 41 are interconnected so that the only way the excess conveyor chain 21 between each pair of sprockets 41 can be absorbed is by contraction or collapse.

Actually, as best shown in Fig. 3 of the drawings, the conveyor chain 21 between the pairs of sprockets 41 is folded or pleated like the bellows of an accordion so that the single links 23 are stacked side by side, as are the double links 24. The pairs of interconnected sprockets 41 maintain the links of the conveyor chain 21 stacked together in this manner throughout the curvilinear section 17 of the conveyor 16 and, as one link is unstacked at the downstream end of the stack, a similar link is added to the stack at the upstream end thereof.

Thus, the pairs of interconnected sprockets 41, i. e., the pair on the upper shafts 38 and the pair on the lower shafts 39, collapse or contract the upper and lower runs of the conveyor chain 21 to curve the conveyor 16 throughout the curvilinear section 17 thereof. Various radii of curvature for the curvilinear section 17 may be provided, as by providing links 23 and 24 of different widths. As will be apparent, increasing the widths of the links 23 and 24 will increase the radius of curvature of the curvilinear section 17. Similarly, the radius of curvature may be decreased by employing links 23 and 24 of lesser width.

As best shown in Fig. 2 of the drawings, when the conveyor chain 21 is pleated by stacking the links 23 together and the links 24 together in the manner described, alternate rods 25 are displaced downwardly so that they are ineffective as load supporters. Preferably, the alternate rods which remain effective maintain substantially their original levels, or, at most, move upwardly only slightly as the links of the conveyor chain 21 are stacked or jack-knife. The vertical positions of the pleated portions of the conveyor chain 21 are controlled by two guide means 45 respectively extending between the upper sprockets 41 and the lower sprockets 41. As best shown in Fig. 3 of the drawings, each guide means 45 includes an upper guide member 46 and a lower guide member 47, each of the lower guide members 47 preferably extending from one end of the conveyor 16 to the other so as to provide support for the conveyor chain 21 throughout its entire length. The guide members 46 and 47 of each guide means 45 provide entry and exit portions 48 and 49 of widths substantially equal to the thickness of the conveyor chain 21, the intermediate portion of each guide means 45 being wider to receive the stacked links 23 and 24. By varying the vertical position of the intermediate portion of each guide means 45 relative to the entry and exit portions 48 and 49 thereof, the level of the effective rods 25 may be varied as desired, it being preferable to maintain the level of the effective rods in the curvilinear section 17 as close as possible to the level of the sections of the conveyor 16 adjacent the curvilinear section thereof. However, it is ordinarily necessary to permit the effective rods 25 throughout the curvilinear section 17 to ride a little above the rods adjacent the curvilinear section to attain the folding action of the conveyor chains 21 in the intermediate portions of the two guide means 45.

Preferably, two guide means 50 for the respective runs of the conveyor chain 22 are provided throughout the curvilinear section 17 of the conveyor 16, each guide means 50 including upper and lower guide members 51 and 52. The lower guide member 52 of each guide means 50 preferably extends from one end of the conveyor 16 to the other to provide support for the conveyor chain 22 throughout its entire length.

Thus, by collapsing or contracting the conveyor chain 21 throughout that zone of its path which is within the curvilinear section 17 of the conveyor 16, the conveyor 16 negotiates a curve of 90°, the extra lengths of conveyor chain 21 being absorbed by the pleating action resulting from the stacking or jack-knifing of the links 23 and 24 thereof. As will be apparent, the angle through which the curvilinear section 17 extends may be increased or decreased from the value of 90° shown, depending upon requirements of a particular installation. Also, this curvature may be continued helically to provide a helical conveyor, if desired.

The linear section 18 of the conveyor 16 is similar to the curvilinear section 17 thereof, the only difference being that both conveyor chains 21 and 22 are collapsed or contracted throughout the linear section. The linear section 18 includes shafts 38a and 39a corresponding directly to the shafts 38 and 39, each of these shafts carrying sprockets 41a and 42a corresponding to the sprockets 41 and 42. Instead of being disposed at right angles to each other and connected by gearing 43, the shafts 38a are interconnected by a chain 61 trained around sprockets on the two shafts 38a, the shafts 39a being interconnected in a similar manner. The linear section 18 includes guide means 45a and 50a, both of which are similar to the guide means 45 of the curvilinear section 17.

The operation of the linear section 18 is similar to that of the curvilinear section 17, the only difference being that both of the conveyor chains 21 and 22 are pleated throughout the linear section 18. This has the effect of reducing the speed of the conveyor 16 throughout the linear section 18, which effect may be utilized to space apart articles being transported by the conveyor 16. In other words, closely spaced articles being transported by the linear section 18 will be spaced apart as they leave this linear section because of the increased speed of the conveyor 16 downstream from the linear section.

Although the linear section 18 has been described as having means for contracting both the upper and lower runs of the conveyor chains 21 and 22, it will be apparent that only the upper run may be contracted if desired.

Referring to Fig. 5 of the drawings, illustrated therein is a sprocket 70 which is driven by the sprocket 41 at the upstream end of one of the pleated portions of the chain 21. The sprocket 70 rotates in the opposite direction from the sprocket 41 so as to move in the same direction as the chain, the connection between the sprockets 41 and 70 being shown diagrammatically as a crossed belt 71. The teeth on the sprocket 70 are so spaced that they engage alternate rods 25 to assist in jack-knifing the links 23 and 24 of the chain 21. In effect, the sprocket 70 acts as a cam means for camming the links of the chain 21 into a jack-knifed condition. The advantage of this embodiment is that all of the active rods 25 are on the same level.

In the embodiment of Fig. 6 of the drawings, the upper guide member 46 of one of the guide means 45 is shown as having a downward cam projection 74 which tends to deflect the links 23 and 24 of the chain 21 downwardly to assist in the jack-knifing operation.

The embodiment illustrated in Fig. 7 of the drawings includes two cam projections 77 and 78 respectively formed in the upper and lower guide members 46 and 47 of one of the guide means 45, these cams projections acting on the links 23 and 24 as shown to initiate the pleating or jack-knifing operation.

Figs. 8 and 9 of the drawings illustrate the presently preferred embodiment, which includes a guide means 81 having an entry portion 82 acting on the rods 25 only, instead of the links 23 and 24. In all other respects, the guide means 81 is similar to one of the guide means 45. This embodiment permits the links to pivot freely without interference by the guides, which is an important feature.

In the embodiment illustrated in Figs. 10 and 11 of the drawings, alternate ones of the rods 25 extend beyond the chain 21, these extensions being indicated by the numeral 85 and engaging a cam surface 86 on an upper guide member 87 corresponding to one of the upper guide members 46. The cam surface 86 curves downwardly at 88 to displace downwardly the alternate rods 25 which carry the extensions 85 to assist in jack-knifing the links of the chain 21. All the active rods are at the same level in this embodiment.

Although I have disclosed various exemplary embodiments of my invention for purposes of illustration, it will be understood that these embodiments are susceptible of various changes, modifications and substitutions without departing from the spirit of the invention.

I claim as my invention:

1. In a conveyor, the combination of: two spaced, substantially parallel conveyor elements at least one of which is contractible, said conveyor elements being movable along spaced, substantially parallel paths; cross members extending between said conveyor elements and each connected at its ends to said conveyor elements, respectively; means in mechanically operative relation with at least said one conveyor element for contracting same throughout a predetermined zone of its path, said last named means including interconnected sprocket members engageable with said cross members at opposite ends of said zone.

2. In a conveyor, the combination of: a contractible conveyor member movable along a path; and means, including rotatable idler elements gripping said conveyor member at opposite ends of a predetermined zone of said path, for contracting at least one side of said conveyor member throughout said zone of said path; and means operatively connecting said rotatable idler elements for rotation thereof by said conveyor member in fixed relation.

3. In a conveyor, the combination of: a pleatable conveyor member movable along a path; and means, including rotatable idler elements gripping said conveyor member at opposite ends of a predetermined zone of said path, for pleating at least one side of said conveyor member throughout said zone of said path; and means operatively connecting said rotatable idler elements for rotation thereof by said conveyor member in fixed relation.

4. In a conveyor, the combination of: two spaced, substantially parallel conveyor chains movable along spaced, substantially parallel paths; cross members extending between said conveyor chains and each connected at its ends to said conveyor chains, respectively; and means in mechanically operative relation with at least one of said conveyor chains for pleating same throughout a predetermined zone of its path, said pleating means including interconnected rotatable idler members engaging said cross members at opposite ends of said zone of said path, the unpleated length of said pleated portion of said one conveyor chain being greater than the distance between said rotatable members so that the latter force said one conveyor chain into said pleated condition.

5. A conveyor according to claim 4 wherein said rotatable members are sprockets meshed with said cross members.

6. A conveyor according to claim 4 including two spaced guide members adapted to receive said one conveyor chain therebetween, said guide members providing therebetween entry and exit portions of widths substantially equal to the thickness of unpleated portions of said one conveyor chain, and providing an intermediate portion of a width substantially equal to the thickness of the pleated portion of said one conveyor chain.

7. A conveyor according to claim 6 wherein at least one of said guide members provides a cam engageable by said one conveyor chain for deflecting same to initiate the pleating action.

8. A conveyor according to claim 4 wherein said pleating means includes a sprocket having teeth engageable with alternate ones of said cross members for initiating the pleating action, said sprocket being driven in timed relation with said rotatable members.

9. A conveyor according to claim 4 including cam means engageable by alternate ones of said cross members for initiating the pleating action.

10. A conveyor according to claim 4 wherein said pleating means includes guides engaging said cross members only.

11. In a conveyor, the combination of: two spaced, substantially parallel conveyor elements at least one of which is contractible, said conveyor elements being movable along spaced, substantially parallel paths; cross members extending between said conveyor elements and each connected at its ends to said conveyor elements, respectively; means in mechanically operative relation with at least said one conveyor element for contracting same throughout a predetermined zone of its path, said last named means including idler sprocket members engageable with said cross members at opposite ends of said zone, for rotation thereof by said cross members, and means operatively connecting said idler sprockets for maintaining them in fixed phase relation with respect to each other.

12. In a conveyor, the combination of: two spaced endless conveyor chains comprising a plurality of pivotally connected links; cross members extending between said chains and each connected at its ends to said chains, respectively, to maintain said chains in spaced relation; a curvilinear guide at one side of and between the ends of said conveyor for guiding at least a portion of the length of said conveyor about a curved path, and to oppose the radially inward thrust produced by the curve in said conveyor; the extended length of one of the chains in the curved portion of said conveyor being equal to the outer curved portion of said conveyor, and the extended length of the other chain being greater than the inner curved portion of said conveyor; and means in mechanically operative relation with said other chain for folding the said pivotally connected links thereof toward each other for contracting said other chain throughout the inner curved portion of said conveyor.

13. A conveyor according to claim 12, wherein said means for folding the links of said other chain includes interconnected sprockets engaging said cross members at opposite ends of the curved portion of said conveyor.

References Cited in the file of this patent

UNITED STATES PATENTS

| | | |
|---|---|---|
| 1,557,368 | Kershaw et al. | Oct. 13, 1925 |
| 2,487,354 | McNamara et al. | Nov. 8, 1949 |
| 2,550,716 | Parkes | May 1, 1951 |